(12) United States Patent
Clarke (10) Patent No.: US 8,347,854 B2
(45) Date of Patent: Jan. 8, 2013

(54) INTERNAL COMBUSTION (IC) ENGINE HEAD ASSEMBLY COMBUSTION CHAMBER MULTIPLE SPARK IGNITION (MSI) FUEL SAVINGS DEVICE AND METHODS OF FABRICATION THEREOF

(75) Inventor: William A Clarke, Merced, CA (US)

(73) Assignee: Flexible Ceramics, Inc, Palm Springs, CA (US)

( * ) Notice: Subject to any disclaimer, the term of this patent is extended or adjusted under 35 U.S.C. 154(b) by 603 days.

(21) Appl. No.: 12/665,717

(22) PCT Filed: Jun. 19, 2008

(86) PCT No.: PCT/US2008/007668
§ 371 (c)(1),
(2), (4) Date: Dec. 19, 2009

(87) PCT Pub. No.: WO2008/156822
PCT Pub. Date: Dec. 24, 2008

(65) Prior Publication Data
US 2010/0319656 A1 Dec. 23, 2010

Related U.S. Application Data

(60) Provisional application No. 60/936,472, filed on Jun. 19, 2007.

(51) Int. Cl.
*F02P 15/00* (2006.01)
*H01T 13/20* (2006.01)
*H01T 13/46* (2006.01)
*B32B 18/00* (2006.01)

(52) U.S. Cl. .......... 123/319; 123/169 EL; 123/169 MG; 313/123; 313/141

(58) Field of Classification Search ............ 123/169 EL, 123/169 MG, 310, 636; 313/123, 141, 142, 313/144
See application file for complete search history.

(56) References Cited

U.S. PATENT DOCUMENTS

| 4,436,068 | A * | 3/1984 | Nakamura et al. ............ 123/310 |
| 4,535,735 | A * | 8/1985 | Yoshinaga et al. ............ 123/310 |
| 4,774,914 | A * | 10/1988 | Ward .................... 123/169 MG |
| 5,590,629 | A * | 1/1997 | Codina et al. ................ 123/310 |
| 6,161,520 | A * | 12/2000 | Clarke ........................ 123/310 |
| 6,603,245 | B1 * | 8/2003 | Fletcher ....................... 313/141 |
| 7,441,540 | B1 * | 10/2008 | Minami ........................ 123/310 |
| 7,448,356 | B1 * | 11/2008 | Minami ........................ 123/310 |
| 7,533,643 | B2 * | 5/2009 | Storm ....................... 123/143 B |
| 8,181,618 | B2 * | 5/2012 | Storm ....................... 123/143 B |
| 2007/0209634 | A1 * | 9/2007 | Minami ........................ 123/310 |
| 2010/0320700 | A1 * | 12/2010 | Clarke ........................ 277/627 |
| 2010/0324187 | A1 * | 12/2010 | Clarke ........................ 524/405 |

* cited by examiner

Primary Examiner — Willis R Wolfe, Jr.
(74) Attorney, Agent, or Firm — Robert R. Meads

(57) ABSTRACT

A composite device assembled into a top of a head combustion chamber as a formed in place multiple spark ignition structure with embedded electrodes connected in a series electrical circuit spaced from a single centrally located ignition source to receive an arc from a central spark plug electrode to initiate a series multiple spark ignition within the series electrical circuit.

22 Claims, 4 Drawing Sheets

Flexible Ceramic Multiple Spark Ignition device shown as ring structure with four electrodes and spark plug circular gap in relation to the intake and exhaust valves of the combustion chamber.

Flexible Ceramic Multiple Spark Ignition device revealing embedded four ignition electrodes in series per cylinder with central spark plug circular arc-gap electrode for GM 3500 V6 Engine Cylinder Head Combustion Chamber.

Figure 1a

Flexible Ceramic Multiple Spark Ignition device shown as ring structure with four electrodes and spark plug circular gap in relation to the intake and exhaust valves of the combustion chamber.

Figure 1b
Flexible Ceramic Multiple Spark Ignition device revealing embedded four ignition electrodes in series per cylinder with central spark plug circular arc-gap electrode for GM 3500 V6 Engine Cylinder Head Combustion Chamber.

Figure 2

Insulation Wrapped Nickle/Copper Alloy Wire

Figure 3

Stripped Wire in Sections for Forming the
Electrodes, End Spark and Ground Ports

Figure 4

Stamped Circular Metal Sections With die cut holes

Figure 5

Completed Circuit Revealing the Folded Over MSI Spark Electrodes

INTERNAL COMBUSTION (IC) ENGINE HEAD ASSEMBLY COMBUSTION CHAMBER MULTIPLE SPARK IGNITION (MSI) FUEL SAVINGS DEVICE AND METHODS OF FABRICATION THEREOF

RELATED APPLICATION DATA

The present application claims benefit from commonly owned, U.S. Application for Provisional Patent Application No. 60/936,472, filed Jun. 19, 2007 now abandoned. The present application is related to commonly owned applications, Silicone Resin Composites for High Temperature Durable Elastic Composite Applications and Methods for Fabricating Same, application Ser. No. 12/665,715, now U.S. Pat. No. 8,293,830 and "Red Heat" Exhaust System Silicone Composite O-Ring Gaskets and Method for Fabricating Same, application Ser. No. 12/665,716, now U.S. Patent Application Publication No. 2010/0320700, each filed on even day herewith and each being incorporated by reference as if fully set forth herein.

BACKGROUND OF THE INVENTION

1. Field of the Invention

Multiple spark ignition capability has been incorporated into IC engines by Toyota, Mazda and Clarke & Associates and presented in their technical briefs (References 1, 2 and 3) where the engines equipped with MSI systems consistently performed at three electrodes with a 33% increased fuel efficiency realized. Glass fabric reinforced polysiloxane composite head gaskets have been successfully made with embedded electric circuits (Reference 3) that realized up to 33% fuel savings. Since these earlier efforts new high temperature flexible ceramic composite materials have been developed (see U.S. Pat. No. 8,293,830) that have performed over 350,000 miles cab fleet durability testing (under confidentiality agreement) as exhaust manifold hot-gas composite gaskets (see U.S. Patent Application Publication No. 2010/0320700). The MSI fuel savings device is fabricated with embedded circuits within the high temperature durable flexible ceramic materials. The methods of fabricating the devices comprises innovations in efficiently fabricating affordable composite ignition devices that can be assembled within IC engine head assembles providing up to 33% fuel savings.

2. Description of the Previously Published Art

Plaksin, et.al. German Patent, WO 94/09271 is the earliest recorded patent filed relating to providing multiple spark ignition using head gaskets with embedded electrodes. The Clarke MSI composite device is not a head gasket. The patent was filed in Germany as DE 3530997 Sep. 4, 1986. The patent is specific to teach the use of parallel circuits with diode devices which are necessary for keeping the multiple spark ignition electrodes sparking in balance.

The Clarke composite device is assembled into the top of the head combustion chamber as a vacuum formed in place MSI composite structure with embedded electrodes connected by an "in series" electrical circuit. The Clarke composite device is not directly attached to the ignition source, but uses an arc from the central spark plug electrode to initiate the multiple spark ignition series which is grounded after the last electrode position.

Lipski, U.S. Pat. No. 5,046,466 is superseded by the German Plaksin patent in 1986, 1987 and 1988 filings and is specific to teach the use of a head gasket (Clarke MSI composite device is not a head gasket) with embedded electrodes within a head gasket made with organic substrate materials (e.g., FR 4 fire retardant polymer) that cannot withstand the combustion temperatures of IC engines 850 to 950° C. The circuits as illustrated cannot sustain ignition as suggested. The invention does not use spark plug advantages for avoiding costly electrical attachment requirements. The invention depends on a head gasket to provide the electrodes to the firing locations. The Clarke MSI composite device is not a head gasket.

The Clarke U.S. Pat. No. 6,161,520 is specific to teach the use of a head gasket to provide the multiple spark ignition (MSI). The Clarke MSI composite device is not a head gasket. The Clarke composite device retains the central spark plug, using its electrode to make an arc attachment with the in series circuit eliminating the costly high voltage 520' patent attachment requirement. The Clarke 520' patent is specific to teach that the gasket materials derived from Clarke's copending U.S. patent application Ser. Nos. 08/962,782; 08/962,783 and 09/185,282, all teach the required use of boron nitride as the catalyst for condensation polymerization of the resin blend needed to produce the gaskets. Clarke has verified that boron nitride is not a catalyst as incorrectly claimed. Clarke verified the certainty that boron nitride is not a catalyst by attempting to repeat the 873 patent's FIG. 1 "gel" curve at 177° C. using the preferred CERAC, Inc. item #B-1084-99.5% pure boron nitride.

The Clarke SAE 2002-01-0332 paper (Reference 3) refers to the use of a head gasket to provide the multiple spark ignition (MSI). The Clarke MSI composite device is not a head gasket. The Clarke composite device retains the central spark plug, using its electrode to make an arc attachment with the in series circuit eliminating the costly high voltage 520' patent attachment requirement. Additionally, the methods of producing "flexible-ceramic" laminates capable of high-temperature elastic recovery (FIG. 2) are not addressed. The flexible-ceramic "self extinguishing" property when heat is removed is an essential requirement to prevent combustion pre-ignition in the MSI fuel saving flexible ceramic composite ignition devices.

REFERENCES CITED

Foreign Patent Documents
3530997, Sep. 4, 1986, Germany, Plaksin et. al.
P42352045, Oct. 19, 1992, Germany, Plaksin et. al.
WO 94/09271, Apr. 28, 1994, Germany, Plaksin et. al.
U.S. Patent Documents
U.S. Pat. No. 5,046,466, Sep. 10, 1991, Lipski
U.S. Pat. No. 6,161,520, Dec. 19, 2000, Clarke
Published References
1. Nakamura, N, Baika, T., and Shibata, Y., "Multipoint Spark Ignition for Lean Combustion," Toyota Motor Corporation, *SAE Paper* 852092, October 1985.
2. Birch, S., Yamaguchi, J, Demmler, A., Jost, K., "Mazda's Multi-plug Lean-burn Engine" *Technical Briefs*, Automotive Engineering, October 1992.
3. Clarke, W. A.; Azzazy, M and West, R., *Reinventing the Internal Combustion Engine Head and Exhaust Gaskets*, Clarke & Associates, *SAE PAPER*, 2002-01-0332, (Mar. 4, 2002)
4. Thompson, Raymond, *The Chemistry of Metal Borides and Related Compounds*, reprinted from *PROGRESS IN BORON CHEMISTRY*, Vol. 2, Pergamon Press, (1969) p. 200
5. Sparking Gasket System (SGS), Exhibited by Aura Systems, Inc. at February 1996 SAE Exposition in Detroit, Mich. where a fully operational 2.3-liter Ford Ranger, with 100% MSI gasket driven IC engine capability was demonstrated. Ford Engineers and Scientific Laboratory personnel drove the SGS truck using the SGS multiple sparking gasket ignition or single spark plug or both ignition systems simultaneously as options.

SUMMARY OF THE INVENTION

Objectives of the Invention

It is the objective of this invention to eliminate the need for a physical electrical high voltage attachment by providing an open circular portal for inserting the central spark plug electrode enabling it to initiate the in series ignition by arcing within the 360° gap. The grounding gap portion of the spark is removed so as to not interfere with the assembly.

It is the further objective of this invention to retain the central spark plug for the above advantage and to allow for servicing or replacing the plugs as engine tune up or maintenance schedules may require.

It is the further objective of this invention to provide an ignition device made from preceramic elastic composite material that will be heat cured by the combustion heat to a flexible ceramic MSI composite device where the intake valve zone will remain elastic while the exhaust valve area will have a ceramic surface backed up by elastic layers closer to the head cavities metal surface.

It is the father objective of this invention to provide two additional electrodes more than the three combustion spark ignition electrodes which are redundant as spares with "keepers" that only need to be cut to engage in spark ignition.

It is the further objective of this invention to provide an insulated wire which can be selectively stripped, machine flattened and die cut to form end ports and four spark electrodes (FIG. 1). This stamped wire innovation eliminates the need to weld the electrodes to copper wire.

It is the further objective of this invention to selectively provide the above stamped wire from a nickel-copper alloy which is platinum coated for durable spark ignition erosion resistance.

It is the further objective of the invention to eliminate the use of head gaskets when incorporating embedded electrodes into composite materials to achieve multiple spark fuel savings advantages.

It is the further objective of the MSI composite device to provide sufficient combustion efficiency to realize up to 33% fuel savings for IC engines and to enable retrofitting of standard engines to allow the fuel savings to be also realized in the after market vehicles.

It is the further objective of the invention to provide the optional use of silk screened high electrically conductive carbon circuits in addition to the metallic elements within the laminates for computer chip and reduction in electric circuit advantages.

Figure 1A:
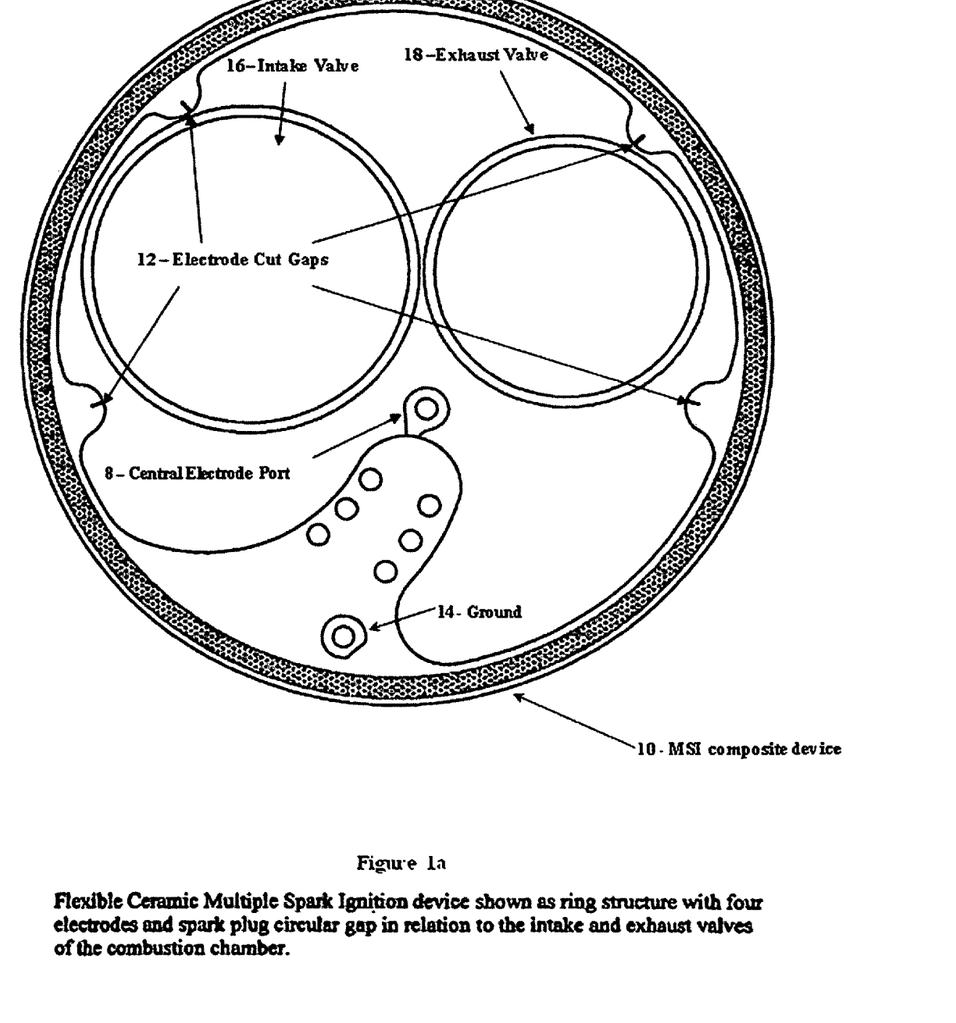
FIG. 1A is a top surface view drawing of the multiple spark ignition (MSI) flexible ceramic device installed in the upper combustion chamber of the IC engine head showing 4 in series electrodes surrounding the central spark plug electrode port in a circuit that ends with the ground.
Figure 1B:
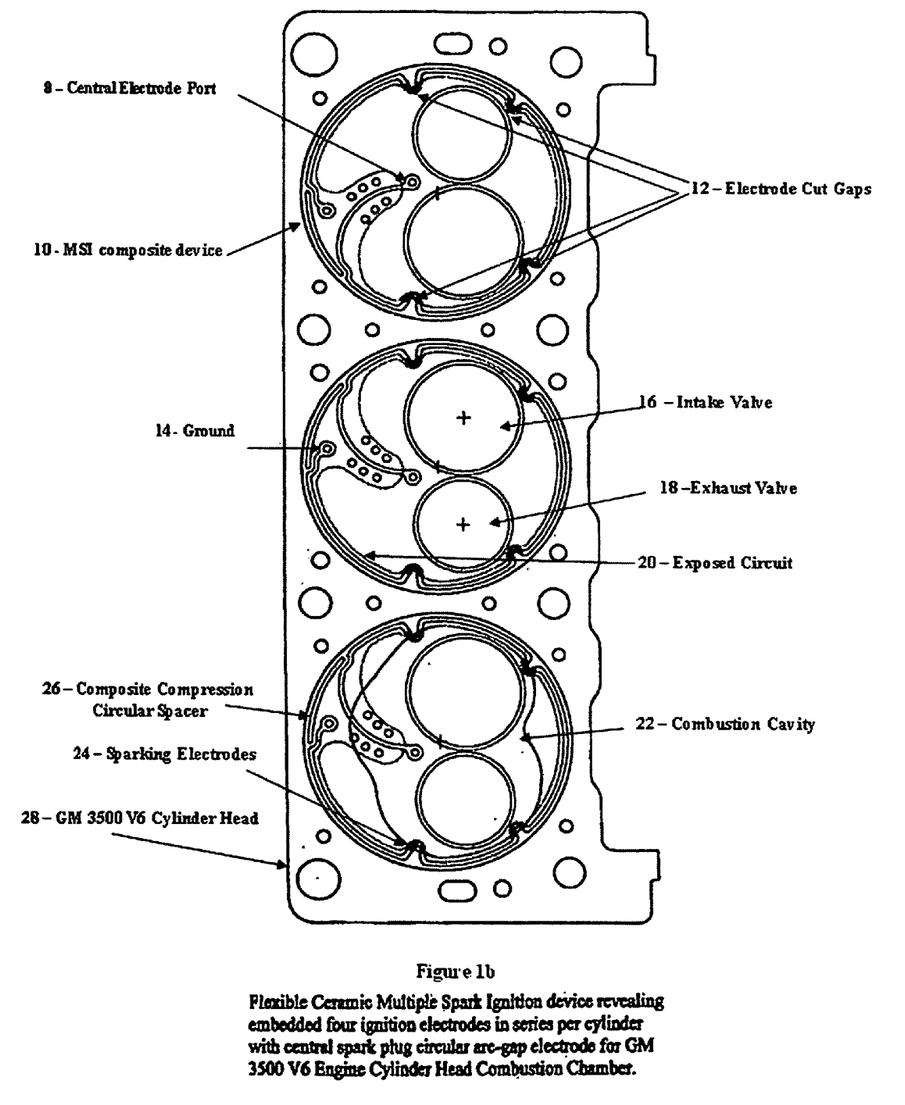
FIG. 1B is a cut away central view drawing of each of the head combustion chambers containing MSI composite devices revealing embedded four ignition electrodes in series per cylinder with central spark plug circular arc-gap electrode for GM 3500 V6 Engine Cylinder Head Combustion Chamber.

The invention comprises a "flexible ceramic" multiple spark ignition (MSI) device that fits inside an IC engine combustion chamber increasing its fuel combustion efficiency by up to 33% and methods of fabrication thereof. Composite combustion devices using electric circuits embedded in fabric reinforced polysiloxane (Reference 3) have achieved 33% superior fuel savings using three spark ignition gap electrodes greater than conventional single spark plug ignition. The cured laminates and laser cutting innovations produces affordable superior three sparks IC engine ignition devices installed inside the combustion chamber of the IC engine head assembly. The key elements of the devices are:

(1) The device comprises a flexible ceramic composite embedded with an surround multiple ignition circuit located inside the top surface area of the IC engine head closed piston combustion chamber (FIG. 1b). The discovered high-temperature FIG. 2 compression recovery property of flexible-ceramic material enables the outer ring structure of FIG. 1a to extend into the piston bore compression ring zone of the head gasket assembly.

(2) The device also comprises four spark ignition gaps (or combination of such gaps) connected in series from the spark plug gap to the ground. Each gap is connected to the next by an insulated nickel/copper wire (or optionally copper wire) embedded in the flexible ceramic composite device. The shape of the embedded circuit (FIG. 1b) is a ring of optional spark ignition gaps starting with the spark plug's centrally located "circular gap" extending out into the ring circuit ending at the ground circular gap and "compression spacer". The edge ends at the cylinder bore combustion compression ring (3) The device comprises a wire (optional foil) circuit wrapped in up to 25% boron nitride filled polyimide sealed with extruded Teflon® coating and embedded between the laminate plies closer to the metal surface and optionally from 0.10 up to 0.25 inches thickness. The composite laminate is processed to a cure ply thickness of 0.0105 (or other Table 1a or b thicknesses), with preferably Table 1a S-glass prepreg and laminate composition. The ignition device comprises an assembly method of vacuum molding the device inside the combustion chamber against the metallic (e.g., aluminum) metal surfaces allowing for attachments at the spark plug threads and head gasket joint locations where the ground wire is clamped during the head assembly.

(4) The device also comprises a simple less costly modified spark plug where the spark plug's stainless steel grounding gap for the spark is eliminated (for prototype work these are simply cut off at the end of the spark electrode gap). This enables the central electrode to be threaded into the first circular gap of the in-series multiple gap circuit. This unobvious design assures the firing of the circuit through an unobvious circular gap opening discovery. The circular opening provides a 360° gap opening for initiating the ignition and to make arc contact without the need for direct attachment. This allows plugs to be replaced, inspected and serviced as needed. Also, the combustion chamber fuel injector optimal location is not affected at the first spark plug gap location which is always a concern of combustion engineers.

(5) The device fabrication methods comprises laser cutting the majority of openings and edges of the composite device forming ceramic sealed edges. The fired surfaces of the composite device are self extinguishing and the preferred nickel gaps are alloyed to sufficient copper to prevent pre-ignition (Reference 1). Interior combustion surfaces of the ignition device are optionally YAG (yttrium, alumina, garnet) laser milled forming optional ceramic edge morphology.

(6) The method of circuit fabrication is shown in FIGS. 3 to 6. The circuit starts with an insulation wrapped wire of nickel-copper alloy which is stipped at the ends and between the ends for allowing for the MSI electrodes. All stripped wire sections are stamped into circular flat sections which are die cut with holes. The electrode circular sections are cut with elliptical holes, then folded over to form the sparking electrodes. The end circular sections are die cut with holes, one of which is the spark plug arcing port and the other is the grounding port. The use of a single wire to form the electrodes and port holes as well as accommodate the wire wrapped insulation is a significant economical method eliminating welding the electrodes to copper wire, and forming the port attachments and grounding without welding.

(7) The methods of fabricating the device also comprises an optional silk screening of vapor grown carbon fiber circuits applied within the composite laminate layers instead of wire or foil circuits or in addition to these circuits.

TABLE 1a

Laminate and Prepreg Material Composition of S-Glass, 6781 8HS Fabric Reinforced Polysiloxane Composites

| Fabric and Filler Properties | | Resin Properties | | |
|---|---|---|---|---|
| Properties | Data | Resin Blend | Parts by Weight | Density (g/cm³) |
| Fabric Areal Weight (g/m²) | 300.07 | SR 355 | 65 | 1 |
| Fiber Density (g/cm³) | 2.48 | TPR 178 | 25 | 0.98 |
| Cured Resin & Filler Density (g/cm³) | 1.33 | TPR 179 | 10 | 0.95 |
| Fabric Thickness inches (mm) | 0.0090 (0.229) | BN | 20 | 2.25 |
| Laminate Porosity | 1% | $SiO_2$ | 6 | 2.4 |

| Laminate Properties | | | | | Prepreg Properties |
|---|---|---|---|---|---|
| $t_L$ Inches (mm) | $V_F$ % | $V_{R+f}$ % | $V_{F+f}$ % | $W_F$ % | $W_{R+f}$ % | $W_P$ gm |
| 0.0080 (0.203) | 59.55 | 39.45 | 64.64 | 74.11 | 25.89 | 4.18 |
| 0.0085 (0.216) | 56.04 | 42.96 | 61.58 | 71.23 | 28.77 | 4.35 |
| 0.0090 (0.229) | 52.93 | 46.07 | 58.87 | 68.58 | 31.42 | 4.52 |
| 0.0095 (0.241) | 50.14 | 48.86 | 56.44 | 66.12 | 33.88 | 4.68 |
| 0.0100 (0.254) | 47.64 | 51.36 | 54.27 | 63.85 | 36.15 | 4.85 |
| 0.0105 (0.267) | 45.37 | 53.63 | 52.29 | 61.72 | 38.28 | 5.01 |
| 0.0011 (0.279) | 43.31 | 55.69 | 50.49 | 59.74 | 40.26 | 5.18 |
| 0.0115 (0.292) | 41.42 | 57.58 | 48.85 | 57.87 | 42.13 | 5.35 |
| 0.0120 (0.305) | 39.70 | 59.30 | 47.35 | 56.14 | 43.86 | 5.52 |

Nomenclature
$t_L$ Cure Ply Thickness
$V_F$ Fiber Volume
$V_{F+f}$ Fiber + Filler Volume
$V_{R+f}$ Resin + Filler Volume
$W_F$ Fiber Weight
$W_{R+f}$ Resin + Filler Weight
$W_p$ Prepreg Fabric Weight of 4" × 4" = 16 in² (103.23 cm²) Test Sample TABLE 1b Laminate and Prepreg Material Composition of E-Glass, 1583 8 HS Fabric Reinforced Polysiloxane Composites

| Fabric and Filler Properties | | Resin Properties | | |
|---|---|---|---|---|
| Properties | Data | Resin Blend | Parts by Weight | Density (g/cm³) |
| Fabric Areal Wt. (g/m²) | 560.80 | Dow Corning 249 | 35 | 1.07 |
| Fiber Density (g/cm³) | 2.585 | Dow Corning 233 | 30 | 1.32 |
| Resin & Filler | 1.27 | Dow Corning 3037 | 25 | 1.07 |
| Fabric Thickness inches (mm) | 0.0179 (0.455) | Dow Corning MR2404 | 10 | 1.11 |
| Laminate Porosity | 1% | BN | 20 | 2.25 |
| | | $SiO_2$ | 6 | 2.4 |

| Laminate Properties | | | | | Density of Prepreg Resin and Additives |
|---|---|---|---|---|---|
| $t_L$ In.(mm) | $V_F$ % | $V_{R+f}$ % | $V_{F+f}$ % | $W_F$ % | $W_{R+f}$ % | $W_P$ gm |
| 0.0140 (0.356) | 61.00 | 38.0 | 66.36 | 76.86 | 23.14 | 7.53 |
| 0.0145 (0.368) | 58.90 | 40.10 | 64.51 | 75.25 | 24.75 | 7.69 |
| 0.0150 (0.381) | 56.93 | 42.07 | 62.76 | 73.7 | 26.3 | 7.85 |
| 0.0155 (0.394) | 55.10 | 43.90 | 61.14 | 72.2 | 27.8 | 8.02 |
| 0.0160 (0.406) | 55.38 | 45.62 | 59.62 | 70.8 | 29.2 | 8.18 |
| 0.0165 (0.419) | 51.76 | 47.24 | 58.19 | 69.4 | 30.6 | 8.34 |
| 0.0170 (0.432) | 50.24 | 48.76 | 56.84 | 68.2 | 31.9 | 8.49 |
| 0.0175 (0.445) | 48.80 | 50.20 | 55.56 | 66.9 | 33.1 | 8.65 |
| 0.0180 (0.457) | 47.44 | 51.56 | 54.36 | 65.7 | 34.3 | 8.81 |
| 0.0185 (0.470) | 46.16 | 52.84 | 53.23 | 64.5 | 35.5 | 8.98 |
| 0.0190 (0.483) | 44.95 | 54.05 | 52.16 | 63.4 | 36.6 | 9.13 |

For Nomenclature, please see Table 1a.

TABLE 2

Volume and Mass Calculations Forecasting Table 2 Press Cured Laminate Properties from Prepreg Formulations Nomenclature

| $t_F$ | Cure ply thickness of fabric | $W_R$ | Weight of resin |
|---|---|---|---|
| $t_L$ | Cure ply thickness of laminate | $W_f$ | Weight of filler |
| $A_W$ | Areal weight of fabric | $W_{BN}$ | Weight of boron nitride |
| $A_F$ | Area of fabric | $W_{SiO2}$ | Weight of silicon dioxide |
| $A_L$ | Area of laminate | $W_L$ | Weight of laminate |
| $A_p$ | Area of prepreg | $W_F$ | Weight of fiber |
| $V_F$ | Volume of fibers | $W_p$ | Weight of prepreg |
| $V_{R+f}$ | Volume of resin + filler | $W_{F+f}$ | Weight of fiber + filler |
| $V_f$ | Volume of filler | $\rho_{BN}$ | Density of boron nitride |
| $V_o$ | Volume of voids | $\rho_{SiO2}$ | Density of silicon dioxide |
| $V_L$ | Volume of laminate | $\rho_{R+f}$ | Density of resin + filler |
| $V_{F+f}$ | Volume of fiber + filler | $\rho_F$ | Density of fiber |

Procedure and Calculations:

(1) $t_F = A_w/\rho_F$
(2) $V_F \% = (t_F/t_L) \cdot 100\%$, where $V_L \% = 100\%$ for $V_F = (t_F/t_L) \cdot V_L$ from $A_F = A_L$ (premise)
(3) $V_{R+f} \% = (V_L - V_F - V_o) \cdot 100\%$, where $V_L \% = 100\%$ and $V_o \% = 1\%$
(4) $V_{F+f} \% = [(V_F + V_f)/V_L] \cdot 100\%$, where $V_{R+f} = (W_R + W_f)/\rho_{R+f}$, then $V_L = V_{R+f}/(V_{R+f} \%/100\%)$, $V_F = V_L - V_{R+f}$ and $V_f = W_{BN}/\rho_{BN} + W_{SiO2}/\rho_{SiO2}$
(5) $W_F \% = (W_F/W_L) \cdot 100\%$, where $W_F = V_F \cdot \rho_F$ and $W_L = W_F + W_f + W_R$
(6) $W_{F+f} \% = [(W_F + W_f/W_L)] \cdot 100\%$, where $W_F = W_{BN} + W_{SiO2}$
(7) $W_P = W_F/(W_F \%/100\%)$, where $W_F = A_w \cdot A_p$

DETAILED DESCRIPTION OF THE PREFERRED EMBODIMENTS

The MSI composite device 10 of the present invention is illustrated in FIG. 1A from the inside head cavity view revealing four thermally insulated electrodes fabricated with high temperature boron nitride loaded composite insulation laser cut with ceramic sealed cut edges including electrode cut spark ignition gaps 12. The internal electrical circuit starts with a central spark plug electrode port 8 which eliminates the need for a high voltage connector for initiating the multiple spark ignition by providing an open port 8 in which the spark plug electrode is inserted enabling the spark plug electrode to arc to the MSI circuit which consists of sparking electrode gaps 12 and a ground 14 which is compressed against the metal head and cylinder block during assembly.

The invention also compresses a unique spark plug with the ground removed so as to assure the arc connection advantage. Invention provides for spark plug replacement and servicing during engine maintenance and tune up operations. The MSI composite device is selectively laser cut to provide valve 16 and 18 clearance holes sealed with a ceramic edge and central spark plug port supporting composite structure with lightener holes allowing for exhaust gas flow during combustion cycles.

FIG. 1b illustrates a cut away view of three individual MSI devices assembled in a GM 3500 V6 engine cylinder head 28 combustion chambers. The exposed circuit 20 starts with the spark plug arcing port 8 and continues in series forming a circular set of four sparking electrodes 12 which ends at the grounding port 14. Each sparking electrode 24 in the circuit series is positioned to overlap into the head cavity combustion chamber 22 which prevents the initial flame front initiating from the sparking gap from being inhibited by head cavity restrictions. The composite device methods of fabrication comprises the laser cutting of the device to assure no restriction of the combustion cavities 22 illustrated in FIG. 1B. The device comprises composite laminate non-conductive fabric and ceramic additive reinforced elastic composite laminate material such as described in the above referenced copending patent applications. Such patent applications should be consulted for a detailed understanding of the formulations, compositions and processing steps proposed for the manufacturing of the MSI composite devices.

Figure 3:
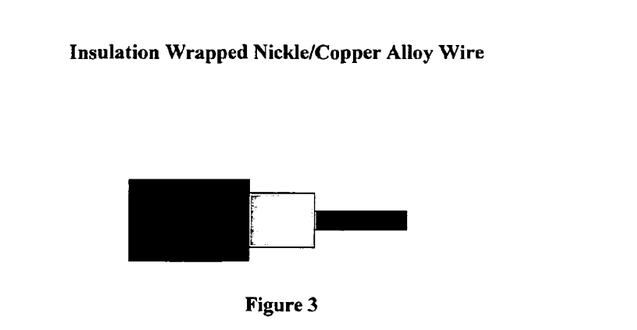
FIG. 3 is a fragmentary, cut away, perspective view of a wrapped wire constructed according to the principles of the present invention
Figure 4:
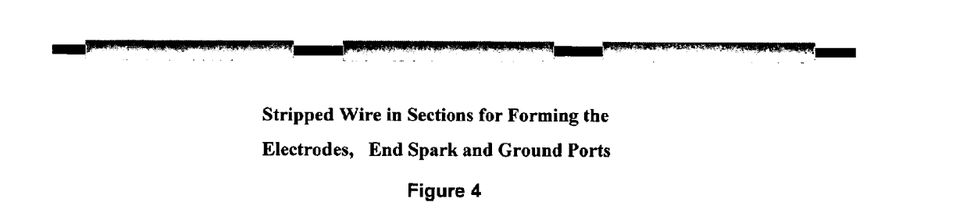
FIG. 4 is a selectively stripped circuit wrapped wire exposing the metallic elements
Figure 5:
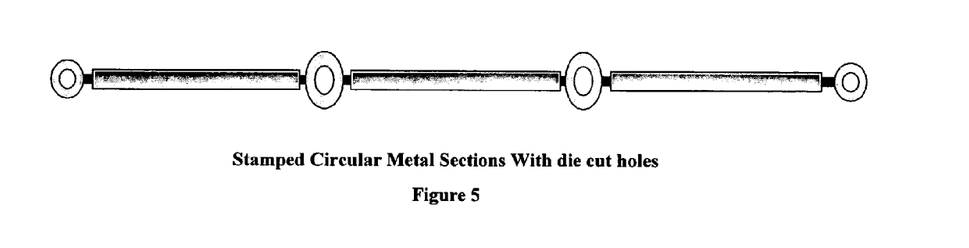
FIG. 5 is the metallic elements stamped and with die cut holes for electrode, spark ignition electrodes and ground compression port.
Figure 6:
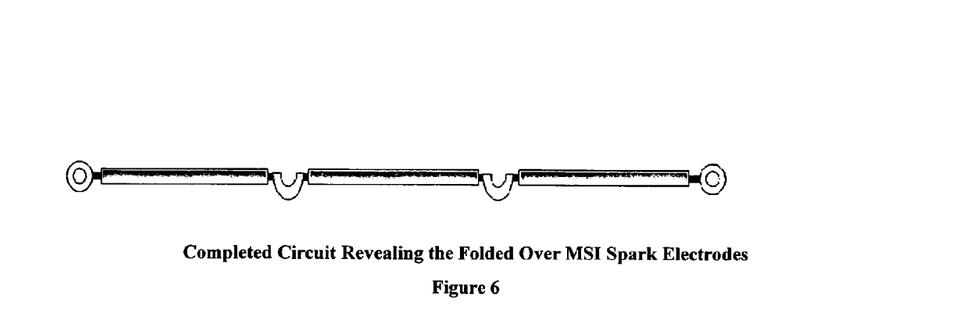
FIG. 6 is the circuit with die cut electrodes before assembly within the laminate as a circular structure as shown in FIG. 1B.

The method of fabricating the wire circuit 20 of the MSI composite device starts with insulation wrapping the wire of FIG. 3 between the insulating layers of 25% boron nitride filled polyimide tape wrapped insulation and Teflon®layers. These insulation layers are selectively stripped (as shown in FIG. 4) to allow for the metal forming of the ports and electrodes as shown in FIG. 5 for the stamping and die cutting of holes method of metal forming. FIG. 6 illustrates the completed circuit when the electrode elliptical die cut holes are folded over to form the sparking electrodes.

The completed MSI composite device provides a surround combustion spark-ignition system 20 is depicted in FIG. 1 comprising the ignition elements of spark electrodes, ground connectors and spark plug electrode insertion port 8.

Central to the present invention, is the invention of the wire circuit metal formed from a nickel-copper alloy composite layered wire metal formed by brinnelling and die cutting with holes used to form the electrodes as depicted in FIGS. 5 and 6. As depicted in FIGS. 1A and 1B, the insulated wire (FIG. 3) is embedded and bonded between the fabric reinforced elastic composite laminate layers forming the composite device 10.

From the foregoing, it should be appreciated that the composite device of the present invention comprises a methyl and phenylselsesquioxane silicon resin and boron nitride, silica and boron oxide additives resin blend formulation and methods of processing that enables the economic manufacture of high temperature flexible ceramic composite materials suitable for use in durable high temperatures ranging from 100 to 500° C. (see FIG. 2) and from 500 to 1000° C. for red heat temperature uses. The elastic silicone polymer used to produce FIG. 2 high temperature durable "flexible ceramic" laminates must be properly resin formulation processed, fabric reinforcement impregnated, laminated and heat cured and preferably also laser processed.

Further, the composite device methods of fabrication comprise the use of the resin blend to produce the prepreg of reinforcement fibers. In that regard, Tables 1a and 1b provide preferred fibers and their corresponding prepreg and laminated compositions and contemplate the use of all textile refractory, ceramic and pre-ceramic (e.g., silicone carbide, silicon nitride and mixtures of these fibers) as well as Nextel fibers, where the laminate and prepreg compositions are within the ranges shown within Tables 1a and 1b adjusted by each fiber's density, weave and yarn properties and sizing preference for high temperature applications.

Figure 2:
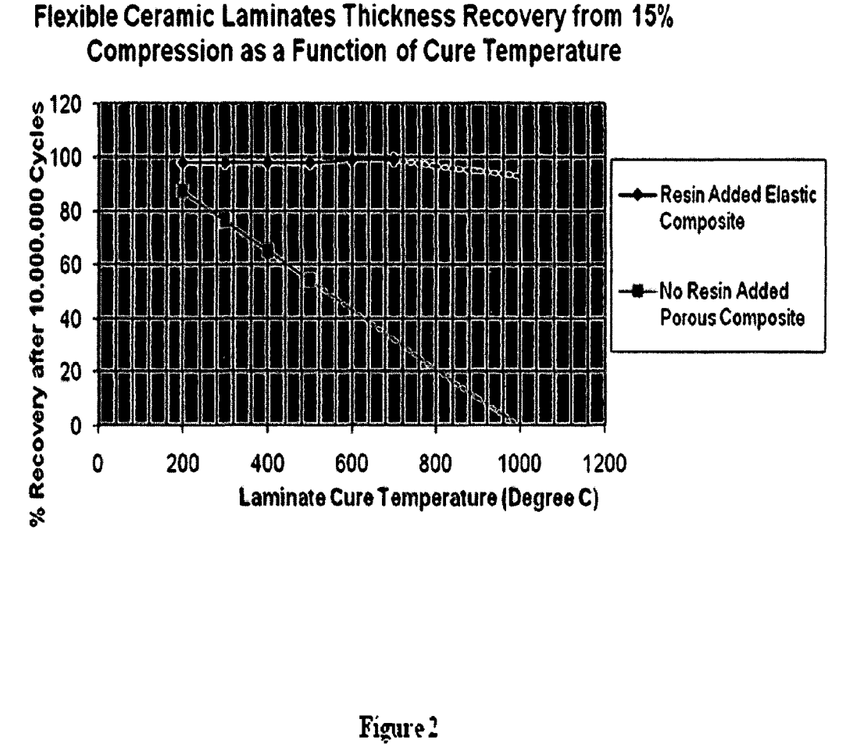
FIG. 2 is a graph illustrating the high-temperature compression recovery property of the resin added flexible-ceramic material of the present invention that enables the outer ring structure of FIG. 1a to extend into the piston bore compression ring zone of the head gasket assembly of the present invention as illustrated in FIG. 1b compared to compression recovery without the addition of the resin added flexible ceramic.

Still further, it is to be appreciated that the composite device comprises a flexible elastic laminate superior in very high temperature elastic retention and compression/recovery reliability as demonstrated in FIG. 2 revealing after 10,0000, 000 fatigue cycles, 90% recovery from 15% compression for heat cured material at exhaust gas temperatures.

Also, from Table 1a, it should be appreciated that the composite device also comprises a flexible ceramic laminate made from a preferred S-glass 8-Harness Satin fabric reinforced polysiloxane that is laminated from an impregnation of the elastic resin blend. Optionally, Table 1b provides an economical reinforcement (1583 8 HS E-glass fabric) for laminating polysiloxane laminates. This discovery in not limited by the example fabrics provided by Tables 1a and 1b but applies to all textile refractory ceramic fabrics where the laminate composition is calculated as given in Table 2 for each fabrics areal weight, density and basic textile composition and additive composition necessary for high temperature performance advantage.

Still further, when the composite materials of the composite device have both a high temperature and high yield greater than 90%, and regions of the composite device are selectively heat treated at temperatures higher than 500° C., those heat treated regions become ceramic while non-heat treated regions remain flexible and porous, for filling (see FIG. 2) with a resin blend and cured at a desired flexible ceramic performance temperature.

Further, the flexible ceramic materials of the composite device are preferably laser cut at temperatures up to 16,500° C. to produce ceramic sealing edges having up to 25% higher tensile strength than when die cut. This discovery enables different types of ceramic edges to be produced by using different ceramic fabric reinforcements when the flexible laminates are produced. For example, each of the following fabrics will have different important ceramic edges: Nextel 610 (alumina), S-glass (alumina, silica, magnesium oxide) or zirconium oxide fabric.

Also, the methods of making composite devices comprises an unobvious use of a nylon woven fabric that performs as a protective heat barrier for enabling multiple laminates to be laser cut without vaporization heat damage between the cut laminate surfaces. The unique nylon woven polymer fabric performs as a tightly woven peel ply without removing resin and as an unobvious heat absorbing inhibitor when the laser is set up for stacked lamination cutting. This enables multiple stacks of laminates to be cut in one mass production operation. The mechanism that allows this advantage is nylon's uncommon melting point property where it melts over a melting temperature range of 100° C. giving time for the laser to cut through multiple laminate stacks without heat damaging the flammable top surfaces of the stacked laminates.

A further feature of the composite device of the present invention resides in the inclusion of a "tri-axial" orientation of fabric plies in its composite reinforcement. In that regard, the fabric plies are preferably oriented in balanced 0°, +60°, −60° wrap stacking orientations. Such multi-layer tri-axial fabric reinforcement enables the FIG. 2 elastic laminate to have superior mechanically assisted elastic recovery from thickness compression and tensile elastic stretching performance modes. Additionally, tensile bars laser cut from the tri-axial laminate have been found to have up to 25% higher tensile strength than shearing die cut bars and the laser cut fiber cut edges have been found to be ceramically sealed with the fiber's ceramic materials. Still further, the composite tri-axial architecture enables cost savings production of durable expansion joints by laser cutting lightener holes within the composite structure separating hot from cooler regions of attachment requiring expansion joints. In that regard, the balanced tri-axial fabric reinforcement enables the laser cut lightener holes to stretch in smaller cross-sectional areas on both sides of the holes and to elastically buckle when compressed without breaking the fibers.

What is claimed:

1. A composite device assembled into a top of a head combustion chamber as a formed in place multiple spark ignition structure with embedded electrodes connected in a series electrical circuit spaced from a single centrally located ignition source to receive an arc from a central spark plug electrode to initiate a series multiple spark ignition within the series electrical circuit, the composite device comprising:

a multiple ply laminated flexible ceramic elastic composite embedded with a surround multiple ignition circuit located within a top surface area of a internal combustion (IC) engine closed piston combustion chamber including an outer ring structure, the flexible ceramic elastic composite being characterized by a high-temperature compression recovery property enabling the outer ring structure to extend into a piston bore compression ring zone of the combustion chamber;

the surround multiple ignition circuit comprising a plurality of spark ignition gaps connected in a series circuit from a centrally located circular spark plug gap to a ground gap, each gap being connected to the next by an insulated conductor embedded in the flexible ceramic composite, the series circuit starting with the centrally located spark gap centrally supporting a spark plug within the head of the piston combustion chamber and extending out into a ring circuit ending at the ground gap.

2. The composite device of claim 1 wherein:
(i) the insulated conductors are striped at their ends and at spaced locations between their ends,
(ii) the insulation stripped ends are stamped into circular flat sections cut with circular holes forming the spark plug arcing port and the ground,
(iii) the spaced insulation striped sections are stamped into flat sections that are cut with elliptical holes electrode and folded over to form the spaced sparking electrodes, and
(iv) one of the circular end sections forming the centrally located spark plug supporting gap and the other of the circular end sections forming the ground gap.

3. the composite device of claim 1 wherein the gaps are formed of a nickel material.

4. The composite device of claim 1 further comprising a compression ring between the multiple ply laminated ceramic elastic composite and head combustion chamber in which it is formed.

5. The composite device of claim 1 wherein the series circuit is formed by silk screening vapor grown fiber circuits within plies of the composite device.

6. The composite device of claim 1 wherein the surround multiple ignition circuit is compressed against a metal head of a piston combustion chamber.

7. The composite device of claim 6 wherein the composite device is vacuum molded inside the combustion chamber against its metal head surfaces.

8. The composite device of claims 6 wherein the surround multiple ignition circuit is wrapped in an up to 25% boron nitrate filled polymer sealed with an extruded coating and embedded between plies of the multiple ply laminated flexible ceramic elastic composite.

9. The composite device of claim 1 wherein the spark plug gap and the spark ignition gaps are laser cut to form ceramic edges that are self-extinguishing.

10. The composite device of claim 9 wherein a nylon fabric as a protective heat barrier is located between plies of the multiple ply laminated flexible elastic ceramic.

11. The composite device of claim 9 wherein the gaps are alloyed with copper to prevent pre-ignition.

12. The composite device of claim 1 wherein each ply of the laminated flexible ceramic elastic composite comprises a silicone resin in about 100 parts by weight, boron nitride in about 4 to 40 parts by weight, silica in about 3 to 15 parts by weight and boron oxide in about 0.1 to 1.2 parts by weight, that is catalyzed by the boron oxide to form a silicone reaction mass that is polymerized at ambient temperature to form a porous high molecular-weight silicone polymer to which the silica and boron nitride are added, pores in the silicon polymer being filled with a densification resin blend.

13. The composite device of claim 12 wherein the densification resin blend filling pores in the porous silicone polymer comprises a high molecular weight dimethyl polymer with phenyl silsesquioxane at about 40 to about 70 parts by weight, and at about 10 to 60 parts by weight methoxy terminated dimethyl polymer with methoxy terminated silsesquioxane and a silanol terminated polymethyl siloxane, to which about 20 parts by weight boron nitride and about 6 parts by weight silica are added and mixed.

14. The composite device of claim 13 wherein the multiple ply laminated flexible ceramic elastic composite wherein regions of the elastic composite are heat treated at temperatures higher that 500° C. whereby the heat treated regions become ceramic while non-heated regions remain flexible and porous and are filled with the densification resin blend and cured.

15. The composite device of claims 1 wherein the multiple ply flexible elastic ceramic is supported by a fabric reinforcing material.

16. The composite device of claim 15 wherein the fabric reinforcing material comprises an S-glass prepreg and laminate composition.

17. The composite device of claim 15 wherein the fabric reinforcing material comprises an E-glass prepreg and laminate composition.

18. The composite device of claim 15 wherein the reinforcing material comprises a fabric reinforcement having a tri-axial oriented architecture of fabric plies oriented in a balanced 0°, +60°, −60° warp stacking orientation.

19. The composite device of claim 15 wherein the reinforcing material comprises a refractory ceramic fabric structure impregnated by the resin and densification blend of claim 13 to form a laminate or stack of laminates.

20. The composite device of claim 15 wherein the series circuit is embedded between laminate plies closest to a metal head surface of the combustion chamber.

21. The composite device of claim 20 wherein the thickness of the laminate plies is from 0.01 to 0.25 inches.

22. The composite device of claim 21 wherein the composite laminate is processed to a ply thickness of about 0.0105 inches.

* * * * *